Patented Aug. 7, 1934

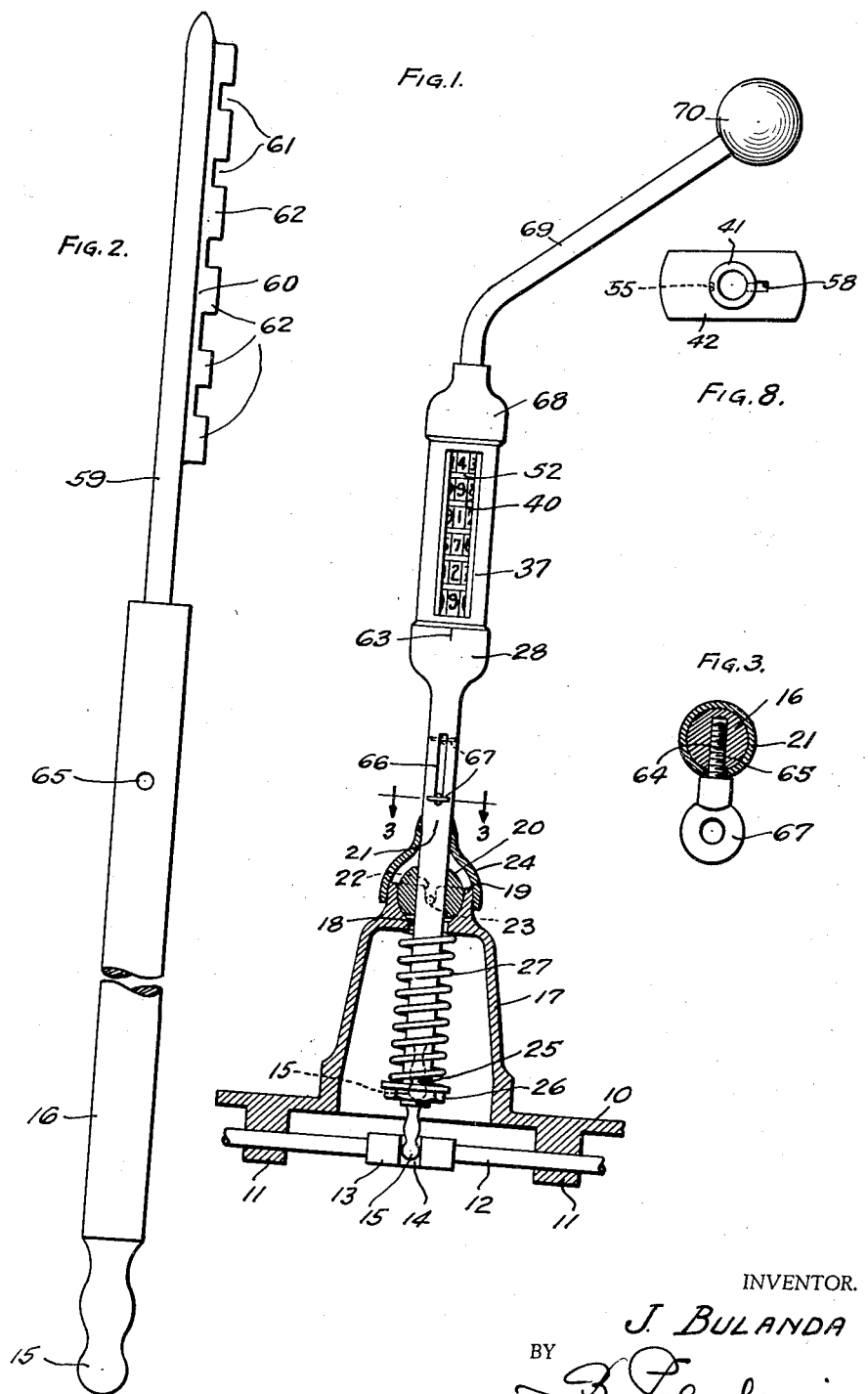

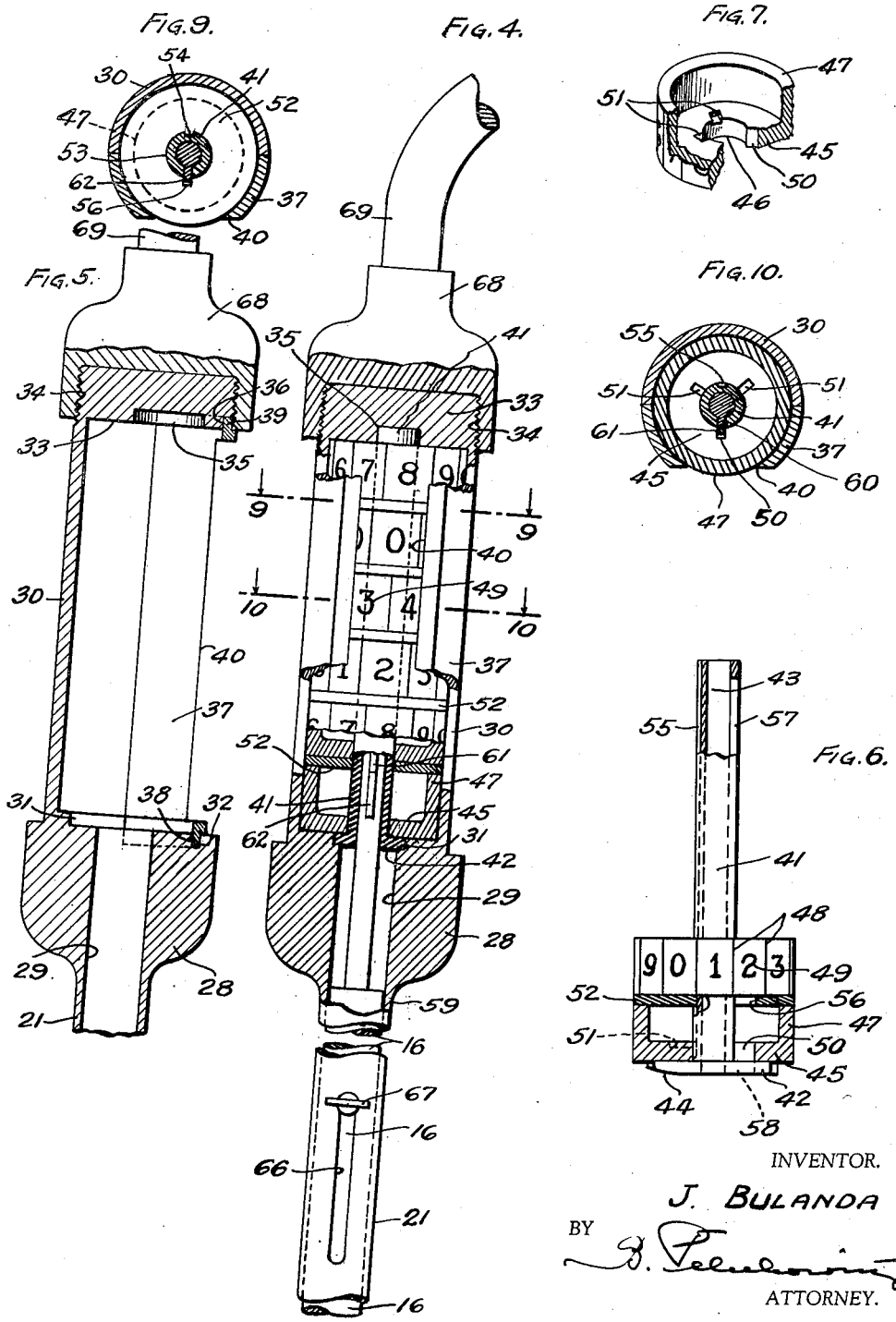

1,969,350

UNITED STATES PATENT OFFICE 1,969,350

AUTOMOBILE LOCK FOR GEAR SHIFT LEVERS

Johann Bulanda, Chicago, Ill., assignor of one-fifth to Frank Bulanda and one-fifth to Joseph Biskup, both of Chicago, Ill.

Application June 1, 1933, Serial No. 673,881

6 Claims. (Cl. 70—128)

The present invention relates to gear shift locks, and has for its object the provision of a locking device in connection with a gear shift lever in motor vehicles. The invention further contemplates the provision of a slidable control lever within a gear shift lever, which control lever when shifted upwardly and disconnected from the gear shift mechanism, or in other words when the same remains in an inoperative position, may be locked within the gear shift lever whereby the latter may become wholly inoperative until the control lever is unlocked.

A further object of the present invention is the provision, in connection with a gear shift lever of the character above indicated, of a permutation lock whereby the control lever may be locked when the same is rendered inoperative or disconnected from the gear shift mechanism.

A further object of the present invention is the provision of means for rendering the mechanism for shifting gears inoperative and thereby to temporarily render the vehicle itself inoperative for preventing the theft thereof.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views, Fig. 1 is an elevational view, partly in cross section, of the gear shifting lever and of the mechanism for supporting the same;

Fig. 2 is an enlarged elevational view of the control lever;

Fig. 3 is a cross-sectional view on line 3—3 of Fig. 1;

Fig. 4 is an elevational view, partly in cross section, of the locking mechanism for the control lever;

Fig. 5 is a vertical cross-sectional view through the casing in the gear shifting lever wherein the locking mechanism for control lever is receivable;

Fig. 6 is a side elevational view, partly in section, of the tubular shaft upon which permutation tumblers are positioned;

Fig. 7 is a perspective, fragmentary view of one of the permutation tumblers;

Fig. 8 is a top plan view of the tubular shaft upon which permutation tumblers are receivable, and of the bottom plate integrally formed therewith;

Fig. 9 is a cross-sectional view on line 9—9 of Fig. 4; and

Fig. 10 is a cross-sectional view on line 10—10 of Fig. 4.

Referring in detail to the present drawings there is shown therein a base plate 10. Integrally formed with said base plate 10 and downwardly depending therefrom are bearings 11 within which lock-out plunger 12 is positioned for sliding movement, with which the usual yokes, not shown, connect for engaging the gear drums, also not shown, for shifting the gears. Said lock-out plunger 12 is provided with box 13 having an opening 14 wherein the lower rounded and globular end 15 of control lever 16 is receivable for sliding said lock-out plunger 12 for shifting the gears as is obvious. This is the usual construction of the mechanism for shifting the gears in a motor vehicle.

Integrally formed with said base plate 10 and upwardly projecting therefrom is a bell-shaped casing 17 having a constricted mouth 18 at its upper end through which the lower end of the gear shifting lever downwardly projects into said bell-shaped casing 17. Said bell-shaped casing 17 above said constricted mouth 18 has an integrally formed and upwardly projecting collar 19, whose inner face is semi-spherically scooped for providing a seat for the globular ring 20 which is rigidly affixed to the gear shift lever, or more specifically to the tubular shaft 21 thereof. Collar 19 in its edge and at two diametrically opposed points has a pair of recesses 22 wherein pins 23 integrally formed with ring 20 enter and wherein the same are adapted to rest. Said pins 23 in conjunction with recesses 22 provide a fulcrum upon which the gear shifting lever may be angularly shifted.

A bell-shaped flange 24, either integrally formed with said tubular shaft 21 or rigidly affixed thereto is provided, its free lower end overhanging the upper end and side of collar 19, for providing a cover for preventing dust and dirt entering between said collar 19 and ring 20.

The lower end of tubular shaft 21 is threaded as at 25 for receiving thereon nut 26. Positioned upon the lower end of said tubular shaft 21 and interposed between mouth 18 and nut 26 is coil spring 27 for the purpose of urging the gear shifting lever into a normal vertical position and also for the purpose of preventing upright sliding movement of the gear shift lever, although obviously permitting upward yielding of the gear shift lever when the same is angularly shifted upon pins 23.

The above mechanism is substantially similar to the mechanism for mounting the gear shifting lever now in use in most of the motor vehicles.

Referring more particularly to the invention constituting the subject matter hereof, the tubular shaft 21 is enlarged at its upper end and terminates and affects a cylindrical block 28 whose bore 29 communicates with and forms a continuation of the bore of said tubular shaft 21, as is clearly seen on Figs. 4 and 5. Integrally formed with the upper end of said block 28 and adjacent the edge thereof is a semi-cylindrical wall 30 which extends upwardly and constitutes a portion of the lock casing hereinafter referred to. The upper end of said block 28, which constitutes the bottom for the lock casing hereinafter described, is diametrically grooved for affecting a recess 31, the inner end of said recess 31 terminating adjacent the inner periphery of said semi-cylindrical wall 30, as clearly seen on Fig. 5. The other half of the upper end of said block 28, oppositely disposed to the portion wherefrom said semi-cylindrical wall 30 projects, has a semi-annular groove 32 for the purpose hereinafter stated.

Integrally formed with the upper end of said semi-cylindrical wall 30 is a disc of substantial thickness, having its periphery threaded as at 34, which overlies the bottom of the lock casing and defines the upper end thereof. The bottom of said disc 33 has an oval recess 35 which remains in parallel relation with recess 31 for the purpose hereinafter stated, said disc 33 at the bottom thereof and at the peripheral portion also oppositely to that which immediately joins with said semi-cylindrical wall 30 being provided with semi-annular groove 36 for the purpose hereinafter specified.

The remaining portion of the lock casing embraces semi-cylindrical plate 37, the lower end of which is reduced in thickness to define lug 38 which is adapted to enter into the semi-annular groove 32 when said plate 37 remains in an operative position. The upper end of said plate 37 is likewise reduced in thickness to define lug 39 which is adapted to enter into semi-annular groove 36 made in said disc 33 when said plate is in an operative position shown on Figs. 1, 4, and 5. Longitudinally, said plate 37 is recessed to define a window 40 through which the numbers on the permutation tumblers hereinafter described may be visible and through which said permutation tumblers may be manually rotated.

Referring now to the locking mechanism, the same includes tubular shaft 41 having at its lower end an integrally formed horizontal oblong flange or plate 42, through both of which bore 43 passes, which bore is in a concentric relation with bore 29 and the tubular shaft 21, when said tubular shaft 41 remains in an operative position as shown on Fig. 4. One of the ends of said plate 42 is beveled as at 44 which construction facilitates insertion of said plate 42 within recess 31, which will be hereinafter described. When said plate 42 remains in an operative position, the upper face of plate 42 will remain flush with the upper end of block 28 or in other words with the bottom of the lock casing, as seen on Fig. 4.

Receivable upon said tubular shaft 41 is a plurality of cup-like tumblers, best shown on Fig. 7 and each of which includes a bottom wall 45 having a central opening 46. Each of said tumblers further includes an annular wall 47 integrally formed with and upwardly projecting from said bottom wall 45. The outer periphery of each of said tumblers is divided into a number of spaces by vertical lines 48, and each of said spaces has a superimposed digit 49, the digits running from numbers 0 to 9, consecutively, or any other arbitrary number of digits depending upon the number of spaces divided by lines 48.

Radially projecting from the central opening 46 in the bottom wall 45 of each tumbler is a recess 50 for the purpose hereinafter described.

The bottom wall 45 of each tumbler is further provided with two or more grooves or recesses 51 radially projecting from central opening 46, which grooves have no other operative function than to constitute false markers the object of which shall be later described.

Further receivable upon said tubular shaft 41 is a plurality of round discs or spacing washers which are in staggered relation with respect to the rotatable tumblers, one of said washers overlying the upper, or open end of each tumbler, as seen on Fig. 4 excepting that there is no washer 52 overlying the uppermost tumbler, as seen on Fig. 4.

Each of said washers 52 includes a central opening 53 which are of the same diameter as openings 46 in the tumblers and are in alignment therewith in the operative assembly of the locking means when said tumblers and said washers remain set upon tubular shaft 41. The inner periphery of the central opening 53 in each washer 52 has a radial offset or tooth 54 which enters into said opening 53, or more specifically, into longitudinal groove 55 made in the tubular shaft 41. By virtue of said tooth 54 of each washer 52 entering said groove 55, the several washers 52 are locked with said tubular shaft 41 for preventing the rotation of all the washers 52 therearound.

Radially disposed with relation to opening 53 in each washer 52 and at a point diametrically opposite from tooth 54, is recess 56 for the purpose hereinafter stated. Thus, when all washers 52 are in operative position upon the tubular shaft 41 all recesses 56 shall remain in alignment.

Tubular shaft 41 is further provided with a longitudinal recess 57 which terminates adjacent the upper end of said tubular shaft 41. Likewise a similar recess 58, in alignment and communicating with said recess 57 in tubular shaft 41, is provided at plate 42 as indicated on Fig. 6.

It is observed that whether or not the locking mechanism is in an operative position or otherwise, recesses 56, 57 and 58 remain permanently in alignment.

It is further observed that the diameter of each tumbler 45—47 corresponds to the diameter of each washer 52. It is further noted that the object of washers 52 is to separate tumblers 45—47 from each other to prevent any contactual relation therebetween so that the manual rotation of one of them would not frictionally engage the adjacent one and rotate the latter.

The control lever 16 has its upper end reduced to affect a plunger rod 59 which has a radially projecting web 60 which remains in a longitudinal relation therewith. Said web 60 has a number of uniformly spaced rectangular notches 61, which define a plurality of uniformly spaced rectangular lobes 62, said notches 61 and lobes 62 being in a relative staggered relation, as clearly seen on Fig. 2.

The control lever 16 with its plunger rod 59 is inserted into tubular shaft 21 through the lower end thereof as one of the first steps in the assembly of the device. To accomplish this tumblers 45—47 must be arranged so that recess 50 of each of said tumblers may remain in alignment with recesses 56, 57 and 58 for accommodating web 60 and its lobes 62 as the same make upright sliding movement. While plunger rod 59 remains in a co-operative relation with tubular shaft 41, the same remains within bore 43 thereof.

There is certain definite relation between recess 50 and the numerical digits 49 or each tumbler 45—47. Thus, referring to Fig. 1, in the uppermost tumbler therein shown it is contemplated that recess 50 should point towards digit 4. In the next tumbler recess 50 points to digit 9, in the following, or third tumbler from top, recess 50 points to digit 1, in the next to digit 7, in the following tumbler said recess 50 points to digit 2, and in the lowermost tumbler its recess 50 points to digit 9. Thus numbers 4, 9, 1, 7, 2 and 9, on all tumblers, reading from top to bottom, shall constitute the combination number and when said numbers on all tumblers are arranged in a vertical relation, as shown on Fig. 1, and substantially remain in the center of window 40, all recesses 50 in all tumblers 45—47 shall be in alignment with recesses 56, 57 and 58, permitting the unimpeded upright sliding movement of plunger rod 59 within bore 43, and of web 60 and lobe 62 within all the recesses, including those in the tumblers, in washers 52, in tubular shaft 41 and in plate 42. A marker 63 made upon block 28 serves to indicate the vertical line upon which the combination numbers should be arranged vertically in all the tumblers in order that their respective recesses 50 may be brought in alignment with recesses 56, 57 and 58, for permitting the unimpeded vertical sliding movement of plunger rod 59 with its web 60 and lobes 62. Of course, the numerical combination above specified, may be altered by simply using other digits upon the vertical wall 47 of the tumbler to remain at a point immediately opposite to the closed end of recess 50 than the particular digit upon each tumbler as hereinabove specified.

As already mentioned, when the combination numbers are properly arranged, the plunger rod 59 with its web 60 and lobes 62 may be vertically shifted, and when the same are so shifted obviously the control lever is likewise vertically shifted within tubular shaft 21 for either bringing the globular end 15 of said control lever 16 outwardly from said tubular shaft 21 as illustrated by full lines on Fig. 1 for the purpose of making said globular end 15 engage box 13, or to shift the same upwardly in order to disengage said globular end 15 from box 13 and lock-out plunger 12 and to bring said globular end 15 within the lower end of tubular shaft 21, the position illustrated by dotted lines on Fig. 1.

The vertical shifting of control lever 16 together with its plunger rod 59 and web 60 and lobe 62 is manually accomplished through the medium of screw 64 which engages control lever 16 at its threaded transverse bore 65 and which passes through oblong recess 66 made at the upper end of tubular shaft 21, the thumb knob 67 remaining outwardly of said tubular shaft 21, as clearly seen on Figs. 1 and 4.

Assuming that combination numbers are properly set, as seen on Fig. 1, the control lever 16 will shift downwardly without much effort of the manual pressure exerted at thumb knob 67, for the purpose of engaging box 13 to operate the lock-out plunger 12 for operating the gear shift mechanism. To disengage said control lever from the gear shift mechanism, in order to bring the lower end thereof to the position shown on dotted lines on Fig. 1, manual upward pressure is exerted at the thumb knob 67 in order to vertically shift said control lever 16 for the purpose of disengaging the globular end 15 of said control lever from the gear shift mechanism, and this operation will be readily accomplished assuming, of course, that the position of the several tumblers 45—47 remained undisturbed in accordance with their combination numbers indicated on Fig. 1. When said control lever 16 with its plunger rod 59 has been completely vertically shifted, thereupon manual rotation may be imparted to any one of the tumblers 45—47 or to several of them, and the tumbler so rotated will shift thereby shifting its recess 50 out of alignment with recesses 56, 57 and 58, and the upper face of the bottom wall 45 of a given tumbler 45—47 will ride beneath and contact with the lower edge of the respective lobe 62. In other words the respective lobe 62 will rest upon and bear against the bottom wall 45 of the tumbler.

When said plunger rod 59 remains in a locked engagement with the locking device hereinabove described the several lobes 62 remain in a vertical relation within their respective tumblers 45—47 and remain interposed between the bottom wall 45 thereof and the immediately following in upright direction washer 52, excepting in the uppermost tumbler wherein the uppermost lobe 62 remains interposed between the bottom wall 45 of said uppermost tumbler and disc 33.

It is further observed that plunger rod 59, as well as its web 60 and lobes 62 and consequently control lever 16, are incapable to make any rotary movement due to the fact that said plunger rod 59 is interlocked with the tubular shaft 41 through the medium of its web 60 and lobes 62, the former remaining within recess 57, and the latter extending inwardly and radially into tumblers 45—47. Likewise tubular shaft 41 is incapable of rotary movement due to the engagement of its plate 42 with block 28 by virtue of said plate 42 being within the oblong recess 31. Washers 52 being interlocked with tubular shaft 41 by virtue of their teeth 54 remaining within groove 55, are also incapable of making any rotary movement either alone or with said tubular shaft 41. Thus, only tumblers 45—47 are capable of rotary movement around tubular shaft 41, it being observed that the outer edge of web 60, or more specifically the vertical edges of notches 61, remaining flush with the outer periphery of tubular shaft 41, as seen on Fig. 10, do not in any way engage the peripheries of the central openings 46 in the several tumblers 45—47.

The immediately locking means between tumblers and lobes 62 constitute the bottom walls 45 of the several tumblers as is obvious from the hereinabove description, and the locking engagement therebetween is continued as long as the tumblers are not properly arranged, or in other words, as long as each tumbler is not properly manipulated in order to bring its recess 50 in alignment with recesses 56, 57 and 58, and consequently in alignment with lobes 62, as the same laterally project from tubular shaft through recess 57. This proper manipulation and arrangement of the several tumblers can be accomplished only by the initiated who knows the proper combination number as hereinabove described.

Plate 42 not only provides a medium for engaging tubular shaft 41 with block 28 through the facility of recess 31 for preventing the rotation of said tubular shaft 41 with respect to the entire gear shifting lever or any portion thereof, but also serves as a temporary support for the tumblers 45—47 and washers 52 while the same in the respective succession are being set upon tubular shaft 41, at the time when originally or prior to the assembly thereof with the other portions of the device said tubular shaft 41 with its plate 42, tumblers 45—47 and washers 52 remains unconnected with the device or prior to the insertion thereof within the lock casing 30—37. Only at that initial stage, prior to the assembly or insertion of said tubular shaft 41 and its tumblers and washers, may the particular combination be ascertained and recorded in order to impart the knowledge thereof to the purchaser or user of the vehicle.

The insertion of tubular shaft 41 and plate 42 with properly arranged tumblers 45—47 and washers 52 within the lock casing ultimately defined by the semi-cylindrical wall 30 and semi-cylindrical plate 37 is facilitated by the oval recess 35 and beveled end 44 of plate 42. It is noted that in the assembled position of tumblers 45—47 and washers 52 upon tubular shaft 41, the upper end of said tubular shaft 41 extends above the uppermost tumbler 45—47. This free portion of the tubular shaft 41 projecting above the uppermost tumbler 45—47, is first inserted in the adjacent end of oval recess 35, and when this is done, the lower end of tubular shaft 41 and more specifically the beveled end of plate 42 is pressed until said plate 42 is caused to enter and slide within recess 31. Thereupon bodily the locking mechanism, including said tubular shaft 41, plate 42, tumblers 45—47, and washers 52, all in assembled condition, is shifted as far as the same will go, or to the position wherein the bore 43 remains in a concentric relation with bore 29, and when in that position, the projecting upper end of tubular shaft 41 shall contact with the opposite end wall of said oval recess 35. The outer end of said plate 42, when the locking mechanism is in position as herein described, shall remain flush with the peripheral wall defined by the continuation of inner peripheral wall of groove 32 and shall contact with the inner periphery of the adjacent portion of semi-cylindrical plate 37 when the same is in an operative position illustrated on Fig. 5.

When said locking mechanism is in position within the lock casing defined by wall 30 and plate 37, thereupon plate 37 by its lug 38 is inserted within groove 32 and its upper end is brought towards disc 33 until the reduced lug 39 is brought within groove 36.

When said plate 37 is in position hereinabove described and constitutes an integral portion of the lock casing in cooperation with wall 30, thereupon cap 68, provided with threads on the inner periphery of its side wall, is screwed down upon disc 33 as far as the same will go in order to lock thereby lug 39 of plate 37 in said groove 36 for preventing its disengagement therefrom and consequently its disengagement from its cooperation with wall 30, the latter contacting by its edges with the adjacent vertical edges of plate 37 as seen on Fig. 5. As there shall be no practical necessity of ever disengaging cap 68 from disc 33, the position illustrated on Figs. 1, 4 and 5, said cap 68 may be permanently soldered by the free lower edge of its downwardly depending side wall to the adjacent portions of semi-cylindrical wall 30 and plate 37, or it may be permanently keyed to said disc 33 by pin or other suitable means, or in any other way said cap 68 may be permanently attached to said disc 33 or to the lock casing 30—37 for preventing said cap 68 from ever becoming disengaged from its assembled condition with respect to the other portions of the device, once said portions of the device, including said cap 68 having been assembled.

The upper end of cap 68 has a concentrically constricted end with which the lowermost portion of handle 69 is integrally formed and from which the same upwardly projects. Said handle then is bent at an angle and at its free end terminates with a knob 70 for the purpose of manual operation of the gear shifting lever for the purpose of operating the gear shift mechanism when the control lever 16 has been brought down to the position shown by full lines on Fig. 1 and after tumblers 45—47 have been properly arranged to disengage therefrom lobes 62 for permitting the downward shifting movement of plunger rod 59 and control lever 16, as hereinabove described.

To render the gear shifting lever inoperative, the control lever 16 is shifted upwardly by applying manual upward pressure at the thumb knob 67 and when said control lever is shifted as far as screw 64 will go within recess 66, in consequence of which operation the lower end of control lever is brought to the position illustrated by dotted lines in Fig. 1 and one or more tumblers 45—47 is rotated in order to lock therewith one or more of lobes 62, thereupon the gear shifting lever shall become wholly disconnected from gear shifting mechanism, in consequence of which fact the gear shifting lever be rendered inoperative, from which fact it follows that the vehicle itself will become inoperative for all practical purposes.

When the control lever 16 is fully within the tubular shaft 21 as illustrated by dotted lines on Fig. 1 and plunger rod 59 is in locked engagement with tumblers 45—47 through the medium of lobes 62 as hereinabove described, in order to render the gear shifting lever inoperative to a greater degree, screw 64 may be disengaged from control lever 16 by unscrewing the same from within bore 65 and applying manual rotary movement to said screw at its thumb knob 67.

The false markers embodied by recesses 51 constitute a safeguard against the unauthorized manipulation of tumblers 45—47 by a person who endeavors to manipulate said tumblers without knowing the correct combination for bringing all of the tumblers in a proper aligned position with respect to recesses 56, 57 and 58. A person not knowing the combination, and rotating one of the tumblers, the same may be aligned by its recess 51 with lobe 62 and the uninitiated person by touch may be led to believe that a proper combination for a given tumbler has been found and shall then proceed with the operation of the following tumblers. Eventually to his dismay the uninitiated person shall be convinced that he did not find a true combination.

While there is described herein a preferred embodiment of the present invention, it is nevertheless to be understood that minor changes may be made therein without departing from the spirit and scope of the invention as claimed.

What I claim as new is:

1. In combination with a motor vehicle including a gear shifting mechanism, a gear shifting lever, a control lever in telescopic relation with said lever whereby said control lever may be shifted longitudinally of said gear shifting lever without changing the length of said gear shifting lever for either engaging said control lever with said gear shifting mechanism or for disengaging the same therefrom, a plunger rod integrally formed at one end of said control lever, a plurality of lobes integrally formed with said plunger rod, and a plurality of permutation tumblers set within said gear shifting lever for engaging said lobes when said control lever is disengaged from said gear shifting mechanism for the purpose of rendering the gear shifting lever inoperative.

2. In combination with a motor vehicle including a gear shifting mechanism, a gear shifting lever, a control lever in telescopic relation with said gear shifting lever whereby said control lever may be shifted longitudinally of said gear shifting lever for either engaging gear shifting mechanism or for disengaging the same therefrom, a screw member for holding said control lever in or out of shifting mechanism engagement, said member operating in a vertical slot in said gear shifting lever, a plurality of lobes integrally formed with and laterally projecting from said control lever, and a plurality of permutation locking elements set within said gear shifting lever for engaging said lobes when said control lever is disengaged from said gear shifting mechanism for rendering said gear shifting lever inoperative.

3. A gear shifting lever of the type described comprising a solid handle portion having a lower screw threaded open end, a lower mechanism engaging portion in the form of a tube having an enlarged upper end formed with a screw threaded portion for engaging in the opening in said upper portion, and a window portion adapted to be fixedly held between said upper and lower gear shifting lever portions.

4. A gear shifting lever of the type described comprising a solid handle portion having a lower screw threaded open end, a lower mechanism engaging portion in the form of a tube having an enlarged upper end formed with a screw threaded portion for engaging in the opening in said upper portion, and a window portion adapted to be fixedly held between said upper and lower gear shifting lever portions, said window portion adapted to rest in semi-circular grooves formed in said upper and lower gear shifting lever portion.

5. In combination with a motor vehicle including a gear shifting mechanism, a gear shifting lever, a control lever in telescopic relation with said lever whereby said control lever may be shifted longitudinally of said gear shifting lever without changing the length of said gear shifting lever for either engaging said control lever with said gear shifting mechanism or for disengaging the same therefrom, a plurality of lobes integrally formed with said control lever, and a plurality of permutation tumblers within said gear shifting lever for engaging said lobes when said control lever is disengaged from said gear shifting mechanism for the purpose of rendering the gear shifting lever inoperative.

6. In combination with a motor vehicle including a gear shifting mechanism, a gear shifting lever, a control lever in telescopic relation with said lever whereby said control lever may be shifted longitudinally of said gear shifting lever without changing the length of said gear shifting lever for either engaging one end of said control lever with said gear shifting mechanism or for disengaging the same therefrom, a plurality of lobes integrally formed with the opposite end of said control lever, and a plurality of permutation tumblers within said gear shifting lever for engaging said lobes when said control lever is disengaged from said gear shifting mechanism for the purpose of rendering the gear shifting lever inoperative.

JOHANN BULANDA.